United States Patent
Riedisser et al.

(10) Patent No.: US 10,240,670 B2
(45) Date of Patent: Mar. 26, 2019

(54) PLANETARY GEARING

(71) Applicant: ZF Friedrichshafen AG, Friedrichshafen (DE)

(72) Inventors: Thomas Riedisser, Lindau (DE); Martin Brehmer, Tettnang (DE); Andreas Geiger, Markdorf (DE); Kim Führer, Lindau (DE); Carl Schilling, Weingarten (DE); Thorsten Müller, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 15/492,557

(22) Filed: Apr. 20, 2017

(65) Prior Publication Data
US 2017/0307064 A1    Oct. 26, 2017

(30) Foreign Application Priority Data
Apr. 21, 2016 (DE) .......... 10 2016 206 745

(51) Int. Cl.
*F16H 57/04* (2010.01)
*F16H 57/08* (2006.01)

(52) U.S. Cl.
CPC ....... *F16H 57/0427* (2013.01); *F16H 57/043* (2013.01); *F16H 57/0479* (2013.01); *F16H 57/0482* (2013.01); *F16H 57/0484* (2013.01); *F16H 57/082* (2013.01)

(58) Field of Classification Search
CPC combination set(s) only.
See application file for complete search history.

(56) References Cited

U.S. PATENT DOCUMENTS

| | | | |
|---|---|---|---|
| 5,480,362 A | 1/1996 | Tanaka et al. |
| 5,910,063 A | 6/1999 | Kato |
| 7,819,775 B2 | 10/2010 | Ziemer et al. |
| 8,512,192 B2 | 8/2013 | Ziemer et al. |
| 8,545,364 B2 | 10/2013 | Ziemer et al. |

(Continued)

FOREIGN PATENT DOCUMENTS

| | | |
|---|---|---|
| DE | 19736686 A1 | 3/1998 |
| DE | 102007037531 A1 | 2/2009 |
| DE | 102009026704 A1 | 12/2010 |

(Continued)

OTHER PUBLICATIONS

German Search Report DE102016206745.1, dated Oct. 20, 2016. (8 pages).

*Primary Examiner* — Jacob S. Scott
*Assistant Examiner* — Murad Jahmani
(74) *Attorney, Agent, or Firm* — Dority & Manning, P.A.

(57) ABSTRACT

A planetary transmission includes a planetary gear set (1), another planetary gear set (2), a fluid line (3) through which fluid is flowable to the planetary gear set (1) and to the other planetary gear set (2), and a fluid collecting device (4) which is in fluid communication with the fluid line (3). The fluid collecting device (4) is connected in a rotationally fixed manner to the planetary gear set (1). The fluid collecting device (4) is configured for dividing the fluid from the fluid line (3) which has flowed into the fluid collecting device (4) into a fluid part which is flowable to the planetary gear set (1) and another fluid part which is flowable to the other planetary gear set (2).

14 Claims, 5 Drawing Sheets

(56) References Cited

U.S. PATENT DOCUMENTS 9,447,863 B2    9/2016  Tonokura et al.

FOREIGN PATENT DOCUMENTS

| DE | 102011005724 A1 | * | 9/2012 | ......... F16H 57/0427 |
| JP | H08270767 A | | 10/1996 | |
| KR | 20120037782 A | | 4/2012 | |
| WO | WO 2014054490 A1 | | 4/2014 | |
| WO | WO 2015194099 A1 | | 12/2015 | |

* cited by examiner

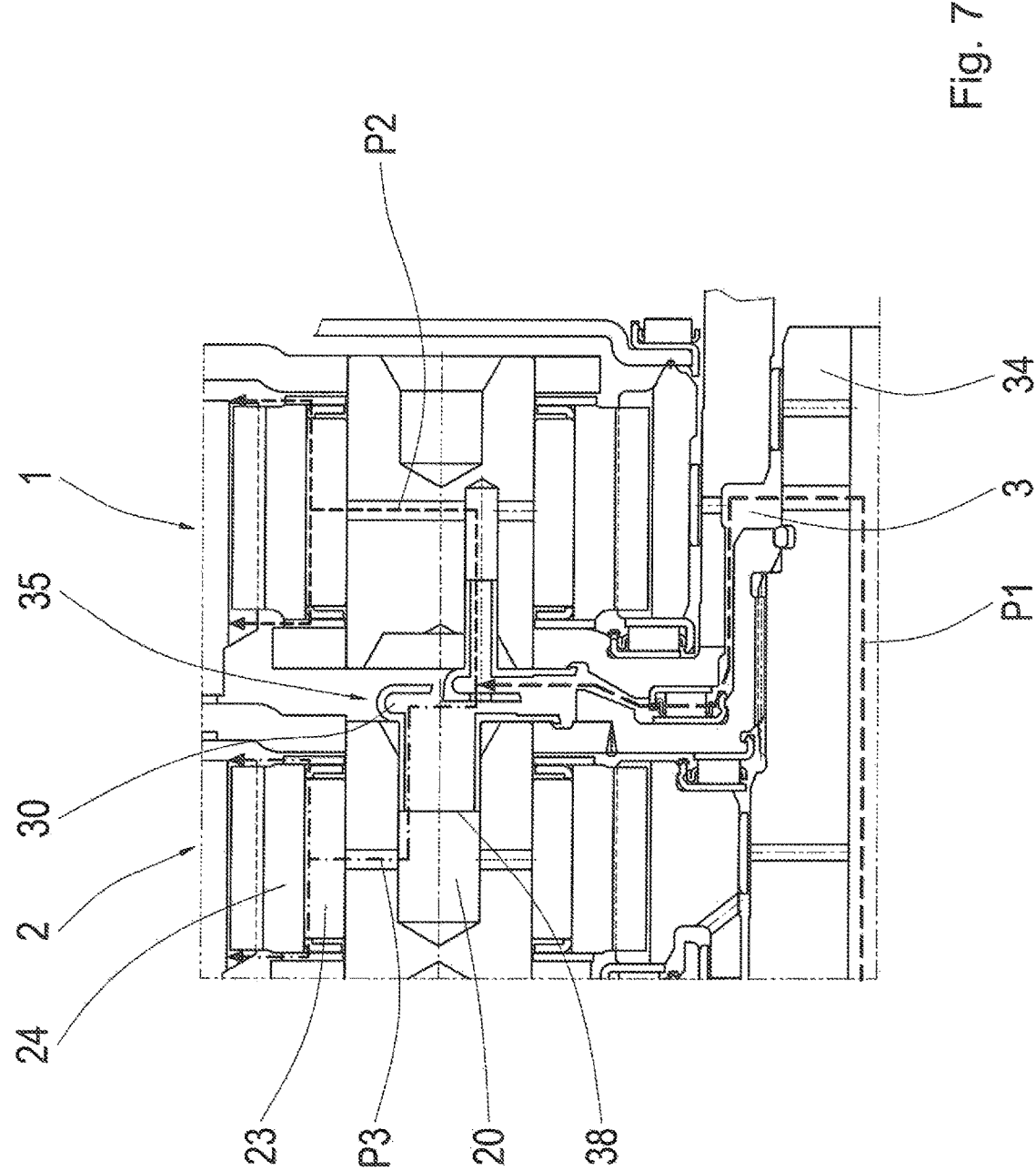

PLANETARY GEARING

FIELD OF THE INVENTION

The invention relates generally to a planetary transmission having a planetary gear set, another planetary gear set, a fluid line, via which fluid can be fed to the planetary gear set and to the other planetary gear set, and a fluid collecting device which is connected fluidically to the fluid line and is connected rotationally fixed to the planetary gear set.

BACKGROUND

The bearings and toothing systems of the components in planetary gear sets require lubrication and cooling by a fluid, such as oil, during operation in order to ensure their function and to guarantee a long service life. Planetary transmissions are already known, in which the fluid which is fed in by a hydraulic supply is guided via a bore of a central shaft of the planetary transmission in the direction of a fluid line which is connected fluidically to a planetary gear set. The fluid which is introduced into the fluid line is collected by a fluid collecting device which is fastened to the planetary gear set, and is guided from there to the planetary gears. It is a disadvantage of such planetary transmissions that each planetary gear set has a fluid collecting device, with the result that the planetary gear sets are large in the axial direction of the planetary transmission and the production is complicated. This is given, as the planetary gear sets arranged next to one another have to maintain an axial distance of approximately five (5) to six (6) mm due to the installation space requirement of the fluid collecting device.

DE 197 36 686 A1 has disclosed a planetary transmission, in which two planetary gear sets which are arranged next to one another are supplied with oil through the same oil line. Moreover, the planetary transmission has an oil catcher for collecting the oil which flows in the oil line. A division of the oil which flows in the oil line into an oil proportion which flows to the planetary gear set and another oil proportion which flows to the other planetary gear set takes place by an axial bearing which is arranged in the oil line. The planetary transmission has the disadvantage that the axial bearing is complicated to manufacture and is therefore expensive to produce.

DE 10 2009 026 704 A1 has likewise disclosed a planetary transmission, in which two planetary gear sets which are arranged next to one another are supplied with oil through the same oil line. In the planetary transmission, a first oil flow is guided via a bore in a spider or carrier plate directly to an oil collecting plate and therefore to a first planetary gear set. A second oil flow flows through an axial bearing and is guided to a second planetary gear set. It is a disadvantage of such planetary transmission that the division of the oil path into a part which is directed to the first planetary gear set and a part which is directed to the second planetary gear set is complicated to produce.

The known planetary transmissions therefore have the disadvantage that they are complicated to produce and/or the installation space requirement of the planetary transmission is great in the axial direction.

SUMMARY OF THE INVENTION

An example object of the invention is a planetary transmission which is compact in the axial direction of the planetary transmission and which can be produced simply and inexpensively.

In an example embodiment, the object is achieved by a planetary transmission of the type mentioned in the field of invention, which is distinguished by the fact that the fluid collecting device divides the fluid which has flowed into planetary transmission into a fluid part which can be fed to the planetary gear set and another fluid part which can be fed to the other planetary gear set.

The planetary transmission according to example aspects of the invention has the advantage that the division of the fluid which is situated in the fluid line takes place by the fluid collecting device, in particular within the fluid collecting device. There is therefore, according to example aspects of the invention, no longer the necessity in the example embodiment to use an axial bearing which is complicated to produce. Moreover, according to the invention, there is no longer the necessity in the example embodiment to provide a fluid division upstream of the fluid collecting device, as a result, the construction and the production of the planetary transmission is simplified. The provision of the fluid collecting device according to example aspects of the invention affords the advantage that a fluid division can be realized without high modification and adaptation costs.

Moreover, as will be explained in greater detail in the following text, the ratio between the fluid part which can be fed, in particular is fed, to the planetary gear set and the other fluid part which can be fed, in particular is fed, to the other planetary gear set, can be set in a very particularly simple way by the fluid collecting device.

In the following text, in the case of a reference to an axial or radial direction, the axial or radial direction of the planetary transmission is meant.

A further advantage of example aspects of the invention consists in that two planetary gear sets which are arranged next to one another in the axial direction can be supplied by the same fluid line with fluid for lubricating and/or cooling the planetary gear sets, in particular the planetary gears. As a result, a planetary transmission can be realized which is compact in the axial direction. In particular, the installation space requirement can be reduced in the axial direction by approximately four (4) to five (5) mm, with the result that the planetary transmission can be reduced in size by this amount. A reduction in size of the planetary transmission has advantages with regard to the material costs, the mass moment of inertia and the weight. Moreover, one advantage consists in that at least one bore can be dispensed with in a central shaft on account of the supply of two planetary gear sets by the same fluid line, which has advantages with regard to the service life of the central shaft.

A fluidic connection between the fluid line and the fluid collecting device corresponds to a connection, in the case of which the fluid line and the fluid collecting device are arranged and configured in such a way that the fluid which flows in the fluid line can flow into the fluid collecting device. This can be realized, for example, by letting the fluid collecting device protrude partially into the fluid line.

In the context of the invention, the fluid collecting device is a device, by which it is ensured that the fluid which is hurled in the fluid line from the radial inside toward the radial outside on account of centrifugal forces can be collected. In addition, the fluid collecting device is a device, by means of which the fluid which has flowed into the fluid collecting device can be divided into a fluid part and another fluid part.

The planetary transmission can be used in a motor vehicle and can be an automatic transmission. In addition, the planetary transmission can have more than two planetary gear sets and/or more than one single fluid line. Here, the supply of two planetary gear sets which are arranged next to one another in the axial direction can take place in each case by a single fluid line. The fluid can be, for example, oil. Other fluids than oil can of course also be used, as long as a lubrication and/or cooling of the planetary gear set and/or of the other planetary gear set is possible with the fluid.

In a special example embodiment, exclusively the fluid collecting device can perform the division of the fluid which flows in the fluid line into the fluid part which is directed to the planetary gear set and into the other fluid part which is directed to the other planetary gear set. This means that no division of the fluid flow upstream of the fluid collecting device into a fluid part which is directed toward the planetary gear set and a fluid part which is directed toward the other planetary gear set takes place in the planetary transmission according to example aspects of the invention. The configuration of the planetary transmission is simplified as a result.

One very particularly advantageous example embodiment has a feed plane, in which the fluid collecting device, in particular a flow duct of the fluid collecting device, and a part of the fluid line, in which the fluid that is to be divided within the fluid collecting device into the fluid part and the other fluid part flows, can be arranged. This means that two planetary gear sets which are arranged next to one another, in particular the planetary gear set and the other planetary gear set, can be supplied with fluid via the same feed plane.

Moreover, the fluid collecting device can be configured in such a way that only a single fluid flow flows into the fluid collecting device and at least two fluid flows flow out of the fluid collecting device. As a result, a fluid collecting device of simple construction can be realized, by which a lubrication and/or cooling of the planetary gear set and/or of the other planetary gear set can be realized in a simple way.

As an alternative or in addition, the planetary transmission can have a central shaft which is connected fluidically to or in fluid communication with the fluid line. The fluid which flows in a bore of the central shaft can flow into the fluid line during operation of the planetary transmission. The fluid collecting device can be arranged and configured in such a way that the fluid (in particular, the entire fluid) which has flowed out of the bore of the central shaft into the fluid line flows into the fluid collecting device. This ensures in a particularly simple way that exclusively the fluid collecting device performs the division of the fluid that flows in the fluid line to the planetary gear set and the other planetary gear set. The central shaft can correspond to a shaft which can be connected to, for example, an engine output shaft rotationally fixed by a clutch. Moreover, the central shaft can be connected rotationally fixed to the planetary gear set and/or to the other planetary gear set.

The fluid collecting device can be connected rotationally fixed to a planetary gear pin. The rotationally fixed connection can be positively locking or friction locking. In addition, the connection can be configured as a connection which can be released again. In particular, the connection can be configured as a clip connection in such a way that a mounting clip is clipped into a cutout which is provided in the planetary gear pin. A simple connection of the fluid collecting device to the planetary gear set is realized as a result.

In one very particular example embodiment, the fluid collecting device can have at least a first outlet opening, via which the fluid part exits from the fluid collecting device, and at least a second outlet opening, via which the other fluid part exits from the fluid collecting device. Thus, a fluid connecting device which can perform fluid division is provided in a very particularly simple way.

The fluid part can exit via the first outlet opening into a longitudinal duct of the planetary gear pin. From the longitudinal duct, the fluid part can be guided by at least one radial bore in the planetary gear pin to a planetary bearing and the planetary gear toothing system of a planet.

Hereby, the first outlet opening can have the same flow cross section as the second outlet opening. As an alternative, the first outlet opening can of course have another flow cross section than the second outlet opening. The first outlet opening and the second outlet opening can be arranged coaxially with respect to one another. As an alternative, it is possible to arrange the first outlet opening such that it is shifted in the radial direction with respect to the second outlet opening. The ratio between the fluid part which flows toward the planetary gear set and the other fluid part which flows toward the other planetary gear set can be set in a particularly simple way by the configuration and/or arrangement of the first outlet opening and the second outlet opening.

The fluid collecting device can have a chamber for receiving the fluid which flows in the fluid line. The chamber can be arranged and configured in such a way that a division of the fluid into the fluid part and the other fluid part takes place only if the chamber is overflowing. In particular, a division of the fluid which has flowed into the fluid collecting device can take place only when the chamber is filled completely with fluid.

The fluid collecting device can have a rear side, from which at least one projection extends, the projection having the first outlet opening. The rear side of the fluid collecting device corresponds to the side which, in the connected state of the fluid collecting device to the planetary gear set, is arranged closer to the planetary gear set than to the other planetary gear set. In particular, the rear side can bear directly against an end side of a planetary carrier and/or the planetary gear pin. The projection can penetrate into the above mentioned longitudinal duct of the planetary gear pin and/or can be of hollow-shaped configuration. Moreover, at least one mounting clip can extend from the rear side, which mounting clip serves to produce a clip connection to a cutout in the planetary gear pin. Axial and radial fixing of the fluid collecting device can be realized in a simple way by means of the mounting clip.

The fluid collecting device can have a front side which has the second outlet opening. The front side of the fluid collecting device corresponds to a side of the fluid collecting device, which side, in the connected state of the fluid collecting device to the planetary gear set, is arranged closer to the other planetary gear set than the rear side.

The fluid collecting device can be of annular configuration in axially normal cross section. The projections and the mounting clip can extend from the rear side in the same axial direction. Here, as viewed in the circumferential direction of the rear side, the projections and the mounting clips can be arranged on the rear side such that they alternate and are distanced from one another. The front side can have a plurality of second outlet openings which are arranged at a distance from one another in the circumferential direction. As a result, the collecting and distribution of the fluid which flows in the fluid line can be realized by a fluid collecting device of simple construction.

A flow duct can be present between the front side and the rear side of the fluid collecting device, into which the fluid which is situated in the fluid line flows to enter the fluid collecting device. The flow duct can open into the chamber in the radial direction. Hereby, the chamber can be arranged in the radial direction above the first outlet opening and the second outlet opening. As a result, with a fluid collecting device which is configured in that manner, the fluid which is hurled in the fluid line from the radial inside toward the radial outside on account of centrifugal forces passes through the flow duct into the chamber and is backed up there.

In one very particular example embodiment, another fluid collecting device can be present which is connected rotationally fixed to the other planetary gear set. The rotationally fixed connection can be positively locking or friction locking In addition, the connection can be configured as a connection which can be released again. In particular, the connection can be configured as a clip connection in such a way that another mounting clip is clipped into another cutout which is provided in the other planetary gear set. A simple connection of the other fluid collecting device to the other planetary gear set is realized as a result.

The other fluid collecting device can ensure that, for the case where a part of the fluid which is situated in the fluid line does not flow into the fluid collecting device, said fluid is collected by the other fluid collecting device and is fed to the other planetary gear set. In order to achieve this, the other fluid collecting device can be arranged in the radial direction above the fluid collecting device. As a result, by providing the other fluid collecting device the entire fluid which flows in the fluid line can be fed to one of the two planetary gear sets and therefore no loss of fluid occurs.

It is very particularly advantageous if the other fluid collecting device is configured and arranged in such a way that the other fluid collecting device guides the other fluid part in the direction of another longitudinal duct of another planetary gear pin of the other planetary gear set. This can ensure in a simple way that the entire other fluid part which exits from the fluid collecting device is fed to the other planetary gear set in a simple way. As a result, a supply of the planetary gear set and of the other planetary gear set via a single feed plane can be realized by constructing the fluid collecting device and the other fluid collecting device radially nested and/or engaged into each other.

The fluid collecting device can extend in the axial direction from the planetary gear set. The other fluid collecting device can extend in the axial direction from the other planetary gear set, the extent of the fluid collecting device being directed in an opposed manner with respect to the extent of the other fluid collecting device. The extent of the fluid collecting device and of the other fluid collecting device in the axial direction can be effected in such a way that the fluid collecting device and the other fluid collecting device overlap in the axial direction.

The other fluid collecting device can have another rear side and another front side, another flow duct being present between the other rear side and the other front side. The other rear side of the other fluid collecting device corresponds to the side which, in the connected state of the other fluid collecting device to the other planetary gear set, is arranged closer to the other planetary gear set than to the planetary gear set. In particular, the rear side can bear directly against an end side of another planetary carrier and/or of the other planetary gear pin. The other front side corresponds to a side which, in the assembled state, is arranged closer to the planetary gear set than the other rear side. In contrast to the fluid duct device, the other front side of the other fluid collecting device can have no outlet opening.

At least one other projection can extend from the other rear side, which other projection can be introduced into the other longitudinal duct of the other planetary gear pin. The other projection can have another outlet opening, via which the other fluid part can exit from the other fluid collecting device. The other fluid part which has flowed into the longitudinal duct can be fed via at least one other radial bore in the other planetary gear pin to the other planetary bearings and/or the planetary gear toothing system of the other planets.

Moreover, at least one other mounting clip can extend from the other rear side. The other mounting clip can be clipped into a cutout which is present in the other planetary gear set, in order to fix the other fluid collecting device on the other planetary gear set in the radial and axial direction. The other projections and the other mounting clips can extend in the same axial direction from the other rear side. Here, as viewed in the circumferential direction of the other rear side, the other projections and the other mounting clips can be arranged on the other rear side such that they alternate and are distanced from each other. Hereby, in the installed state of the fluid collecting device and the other fluid collecting device, the other projections and the other mounting clips extend from the other rear side of the other fluid collecting device in an opposed direction to the projections and the mounting clips from the rear side of the fluid collecting device.

Moreover, the other fluid collecting device can have another chamber. Here, the other flow duct can open into the chamber in the radial direction. The other chamber can be arranged in the radial direction above the other outlet opening. As a result, it is realized in a simple way that an outflow of the other fluid proportion out of the other fluid collecting device takes place only when the other chamber is filled completely with fluid.

The other fluid collecting device can be arranged in the axial direction in such a way that an ejection edge of the fluid collecting device and the other fluid collecting device are arranged in one plane. In one very particularly advantageous example embodiment, the ejection edge of the fluid collecting device and the other flow duct are arranged in the plane. This ensures in a simple way that the other fluid part which exits via the second outlet opening flows into the other fluid collecting device and is fed from there into the other planetary gear set. The ejection edge corresponds to that location in the fluid collecting device, at which a breakaway of the fluid flow from the fluid collecting device takes place. The ejection edge can be provided on that edge of the fluid collecting device which is furthest away in the radial direction from a center axis of the planetary transmission. The ejection edge is not of rounded configuration, in order to avoid flow passing around the edge.

As an alternative, the other fluid collecting device can be configured as a plate which is, in particular, formed and, at its end which is remote from the fluid collecting device, is connected rotationally fixed to the other planetary gear set, in particular to the other planetary carrier. The rotationally fixed connection can be produced by forming of the end which is remote from the fluid collecting device, in particular using a roll. The other end of the other fluid collecting device which is directed toward the fluid collecting device can be angled away. Here, the other end can be angled away in such a way that the other fluid collecting device covers the fluid collecting device in the axial direction and/or the ejection edge of the fluid collecting device and the angled-away end of the other fluid collecting device lie in the plane. A configuration of this type of that end of the other fluid collecting device which is directed toward the fluid collecting device ensures that the other fluid part does not flow past the other fluid collecting device.

The longitudinal duct can be oriented centrally or eccentrically with respect to a planetary gear pin axis. The other longitudinal duct can be oriented centrally or eccentrically with respect to another planetary gear pin axis. Here, an eccentric arrangement of the longitudinal duct and a central arrangement of the other longitudinal duct have the advantage that there is sufficient space in the radial direction for the arrangement of the fluid collecting device and the other fluid collecting device, both being configured as embodiments with the projections which extend from the rear side. An embodiment of this type affords the advantage that an internal diameter of the other longitudinal duct can be of smaller configuration than an internal diameter of the one longitudinal duct, in the case of which the other fluid collecting device is configured as a plate. As the planetary gear pins are in any case mounted in an angularly oriented manner due to their radial bores towards the planetary gear bearing, no separate assembly complexity is necessary as a result of an eccentric arrangement of the longitudinal duct or the other longitudinal duct.

The fluid collecting device can be configured as a plastic injection molded part. The other fluid collecting device can be configured as a plastic injection molded part or as a steel plate. The configuration of the other fluid collecting device as a plastic injection molded part may be suitable, in particular, in the case of the embodiment which has other projections which project from the other rear side. The configuration of the other fluid collecting device as a steel plate may be suitable, in particular, when the other fluid collecting device is configured as a plate which is formed in order to produce the rotationally fixed connection to the other planetary gear set.

In one very particularly advantageous example embodiment, a deflection means or deflector for deflecting the fluid in the direction of the fluid collecting device can be arranged in the fluid line. The deflection means ensures that no fluid which flows in the fluid line can flow past the fluid collecting device.

The deflection means can be arranged upstream of the fluid collecting device. Moreover, the deflection means can be arranged in the axial direction in such a way that a deflection means ejection edge and the flow duct of the fluid collecting device are arranged in the feed plane. This ensures in a very particularly simple way that the fluid which is deflected by the deflection means flows into the fluid collecting device. The deflection means ejection edge corresponds to that location in the fluid collecting device, at which a breakaway of the fluid flow from the deflection means takes place. The deflection means ejection edge can be provided at that edge of the deflection means which is furthest away in the radial direction from a center axis of the planetary transmission. The deflection means ejection edge is not of rounded configuration, in order to avoid flow passing around the edge.

The deflection means can be a disk which is formed, in particular is angled away. As an alternative, the deflection means can be an axially projecting region of the planetary gear set, in particular the planetary carrier, or the other planetary gear set, in particular the other planetary carrier. In this way, the deflection means can be realized simply, which has advantages with regard to the component complexity and component costs.

A bearing for axially supporting the planetary gear set and/or the other planetary gear set can be arranged in the fluid line upstream of the deflection means and/or the fluid collecting device.

A motor vehicle which has the planetary transmission according to example aspects of the invention is particularly advantageous.

BRIEF DESCRIPTION OF THE DRAWINGS

The subject matter of the invention is shown schematically in the figures and will be described in the following text. In the figures:

FIG. 7 shows a sectional view of the planetary transmission in accordance with the second example embodiment, a fluid path of the fluid which flows in the planetary transmission being shown.

DETAILED DESCRIPTION

Figure 1:
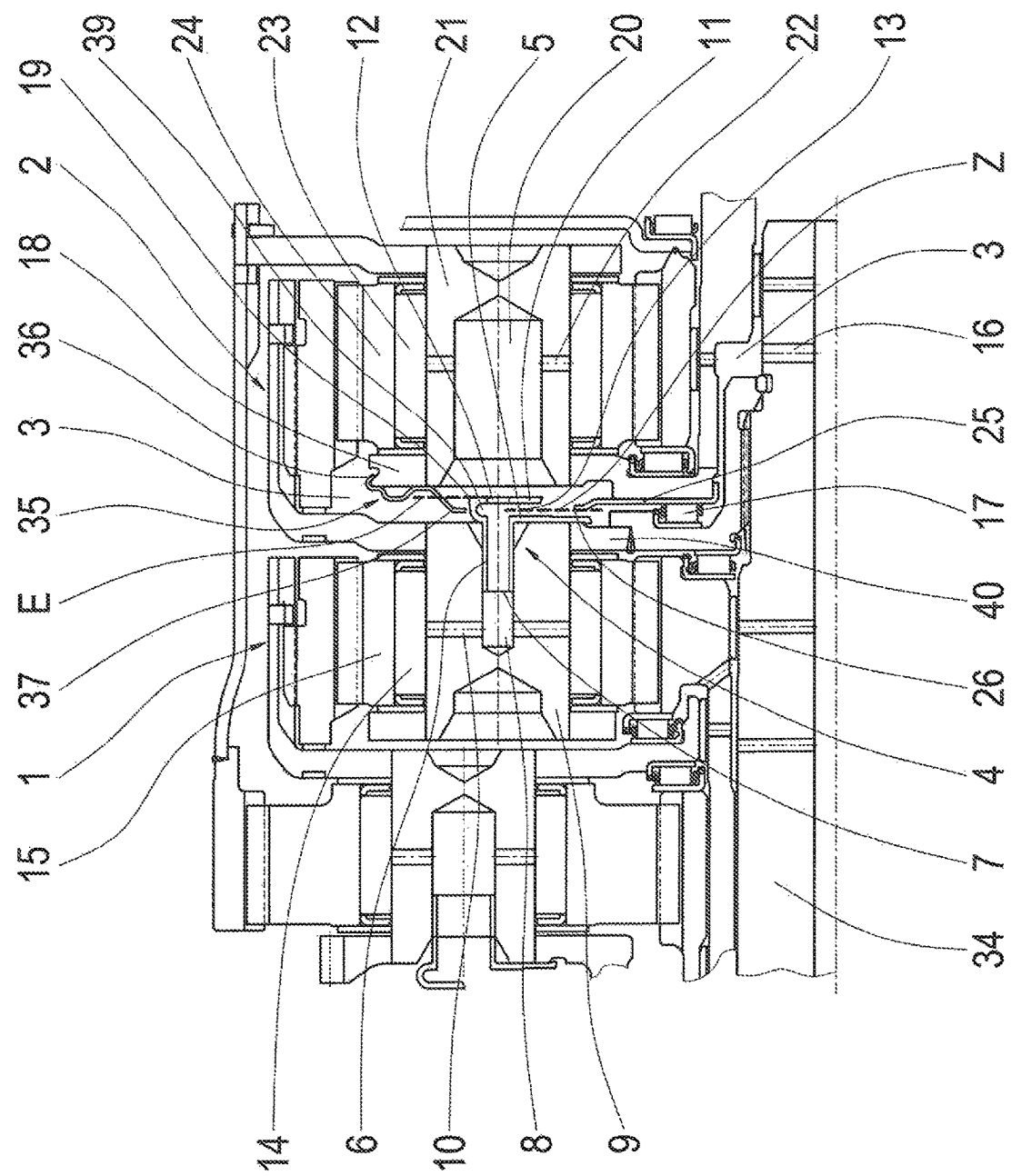
FIG. 1 shows a sectional view of a planetary transmission according to the invention in accordance with a first example embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The planetary transmission (shown in FIG. 1) in accordance with a first example embodiment has a planetary gear set 1, another planetary gear set 2, a fluid line 3, via which fluid can be fed to the planetary gear set 1 and the other planetary gear set 2, and a fluid collecting device 4 which is connected rotationally fixed to the planetary gear set 1. The fluid collecting device 4 is configured and arranged in such a way that the fluid collecting device 4 divides the fluid which has flowed into it into a fluid part which is fed to the planetary gear set 1 and another fluid part which is fed to the other planetary gear set 2. Here, the division into the two fluid parts takes place after the fluid has flowed into the fluid collecting device 4.

The fluid collecting device 4 has a rear side 5, from which a projection 6 extends in the axial direction. The projection 6 has a first outlet opening 7, via which the fluid part which is fed to the planetary gear set 1 exits from the fluid collecting device 4. The rear side 5 bears against a planetary gear pin 9 and a planetary carrier 40, in particular an end side of the planetary gear pin 9 and the planetary carrier 40. Moreover, the fluid collecting device 4 has a front side 11. In relation to the planetary gear pin 9, the front side 11 is arranged further away in the axial direction than the rear side 5. The front side 11 has a second outlet opening 12, via which the other fluid part exits from the fluid collecting device 4. A flow duct 13 is present between the front side 11 and the rear side 5. Moreover, the fluid collecting device 4 has a chamber 39 which is connected fluidically to the flow duct 13. The chamber 39 is arranged in the radial direction above the first and second outlet opening 7, 12.

The projection 6 is of hollow-shaped configuration and is introduced into a longitudinal duct 8 of the planetary gear pin 9. A plurality of radial bores 10 extend from the longitudinal duct 8 within the planetary gear pin 9 as far as a planetary bearing 14 which mounts a planet 15.

The planetary transmission has a central shaft 34 which can be connected rotationally fixed to an engine output shaft, indirectly at an end which is not shown in the Figs. The central shaft 34 has a bore 16 which is connected fluidically to the fluid line 3. The fluid which is present in the bore 16 is provided by a hydraulic supply which is not shown in the Figs.

The fluid line 3 runs in such a way that a first section of the fluid line 3 runs between the planetary gear set 1 and the other planetary gear set 2, in particular in the radial direction. Here, the planetary gear set 1 and the other planetary gear set 2 lie directly next to one another in the axial direction. Moreover, the fluid line 3 has a second section which is arranged in the vicinity of the bore 16 of the central shaft 34 and is connected fluidically to the first section.

Moreover, the planetary transmission has another fluid collecting device which is connected rotationally fixed to the other planetary gear set 2. The other fluid collecting device 35 is arranged in the radial direction above the fluid collecting device 4 and is configured as a formed plate. Here, that end 36 of the other fluid collecting device 35 which is remote from the fluid collecting device 4 is connected rotationally fixed to the other planetary gear set 2, in particular another planetary carrier 18. In particular, the end 36 is formed in such a way, for example by a roll which is not shown in the figures, that the other fluid collecting device 35 is fixed on the other planetary gear set 2 in the axial and radial direction.

Another end 37 of the other fluid collecting device 35, which other end 37 is directed toward the fluid collecting device 4, is of angled-away configuration. In particular, the other fluid collecting device 35 is configured in such a way that it covers the fluid collecting device 4 in the axial direction. The other fluid collecting device 35 is thus arranged in such a way that a plane E exists, in which an ejection edge 19 of the fluid collecting device 4 and the other fluid collecting device 35 are arranged.

The other fluid collecting device 35 is arranged and configured in such a way that the other fluid collecting device 35 guides the other fluid part which has exited via the second outlet opening 11 into another longitudinal duct 20 of another planetary gear pin 21. The other fluid part which has flowed into the other longitudinal duct 20 flows via other radial bores 22 to another planetary bearing 23 of another planet 24. The other longitudinal duct 20 is arranged coaxially with respect to the longitudinal duct 8.

The planetary transmission has a deflection means or deflector which deflects the fluid which is provided by the central shaft 34 to the fluid collecting device 4. The deflection means is configured as a disk 25 and is arranged in the fluid line 3 upstream of the fluid collecting device 4. Here, the disk 25 is connected rotationally fixed to the other planetary gear set 2. The disk 25 is arranged in such a way that a deflection means ejection edge 26 is arranged in a feed plane Z, in which the flow duct 13 of the fluid collecting device 4 is also arranged.

Moreover, the planetary transmission has an axial bearing 17 for axially supporting the planetary gear set 1 and/or the other planetary gear set 2. The axial bearing 17 is arranged upstream of the fluid collecting device 4. The fluid which is situated in the fluid line 3 flows through the axial bearing 17.

Figure 2:
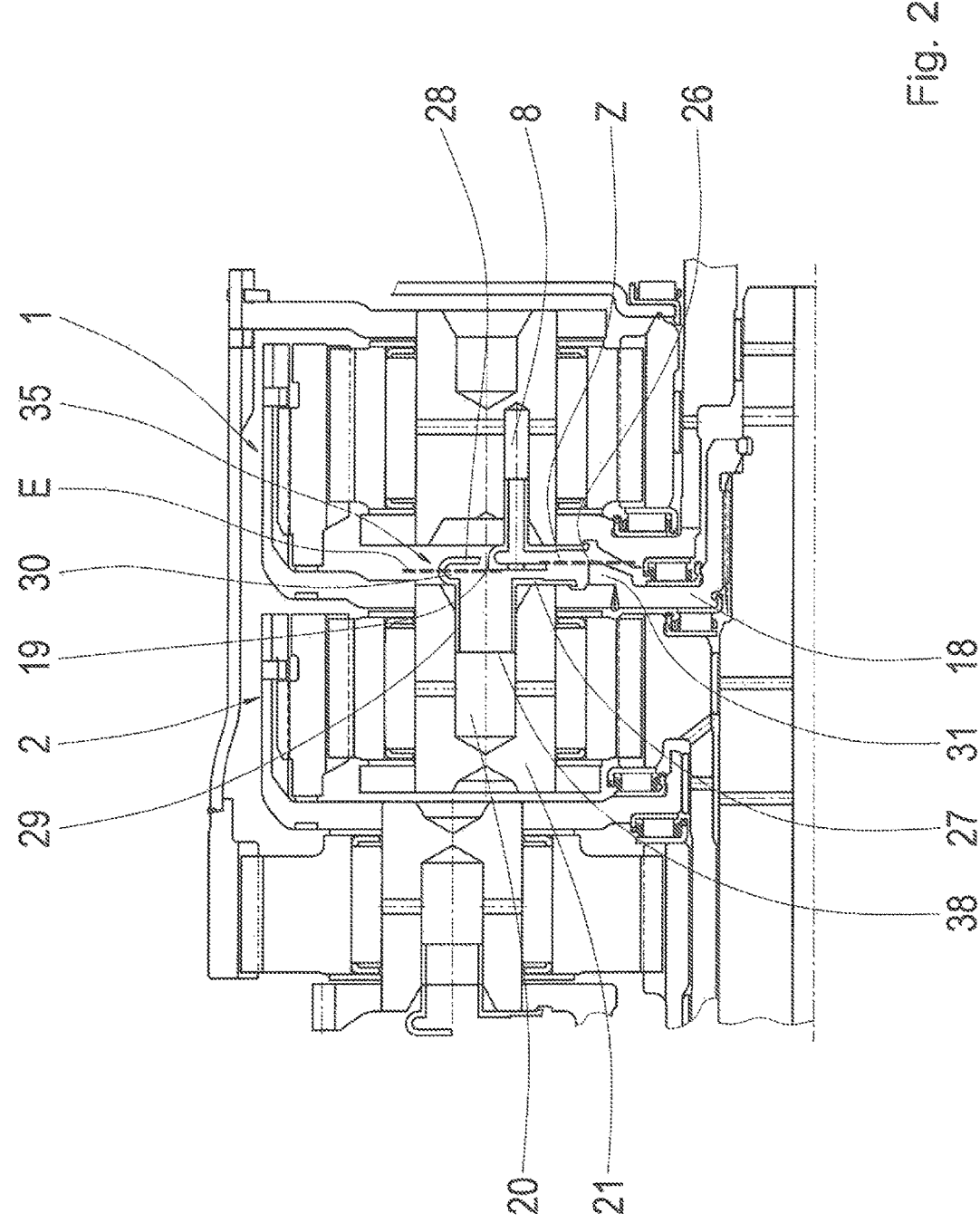
FIG. 2 shows a sectional view of a planetary transmission according to the invention in accordance with a second example embodiment.

FIG. 2 shows a sectional view of a planetary transmission according to the invention in accordance with a second example embodiment. The planetary transmission which is shown in FIG. 2 differs from the planetary transmission which is shown in FIG. 1, inter alia, in terms of the configuration of the other fluid collecting device.

The other fluid collecting device 35 which is used in FIG. 2 has another rear side 27 and another front side 28. Moreover, the other fluid collecting device 35 has another projection 29 which extends from the other rear side parallel to the axial direction. The other projection 29 is of hollow-shaped configuration and penetrates into the other longitudinal duct 20 of the other planetary gear pin 21. Moreover, the other fluid collecting device has another chamber 30 which is arranged in the radial direction of the planetary transmission above another outlet opening 38. Here, the other projection 29 has the other outlet opening 38. The fluid part which has flowed into the other fluid collecting device 35 flows via the other outlet opening 38 out of the other fluid collecting device 35. In contrast to the fluid collecting device 4, the other fluid collecting device 35 does not have a second outlet opening on the front side.

A further difference from the example embodiment which is shown in FIG. 1 consists in that the other longitudinal duct 20 and the longitudinal duct 8 are not arranged coaxially with respect to one another. Moreover, the longitudinal duct 8 is arranged eccentrically with respect to a planetary gear pin axis.

A further difference also consists in that no separately configured deflection means is present which guides the fluid which is situated in the fluid line 3 to the fluid collecting device 4. In the example embodiment which is shown in FIG. 2, the other planetary carrier 18 has a shoulder 31 which projects in the axial direction as a deflection means or deflector. The shoulder 31 extends into the fluid line 3 in such a way that the deflection means ejection edge 26 and the flow duct 13 are arranged in the feed plane Z.

Figure 3:
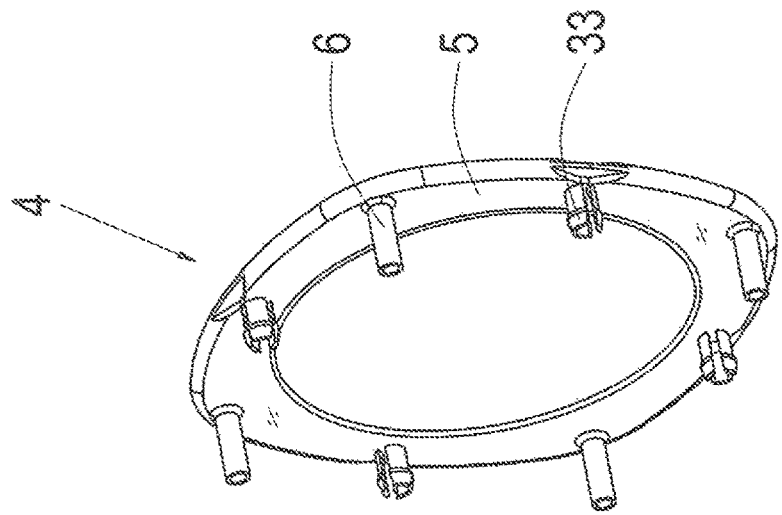
FIG. 3 shows a perspective illustration of an example fluid collecting device from behind.

FIG. 3 shows a perspective illustration of the fluid collecting device 4 from behind. The fluid collecting device 4 is of annular configuration in axially normal cross section. A multiplicity of projections 6 extend from the rear side 5. As viewed in the circumferential direction, the projections 6 are arranged distanced from one another. In addition, a multiplicity of mounting clips 33 extend from the rear side, which mounting clips 33 are clipped into a cutout which is present in the planetary gear set 1 in order to connect the fluid collecting device 4 to the planetary gear set 1. As viewed in the circumferential direction, the projections 6 and the mounting clips 33 are attached on the rear side 5 in an alternating manner.

Figure 4:
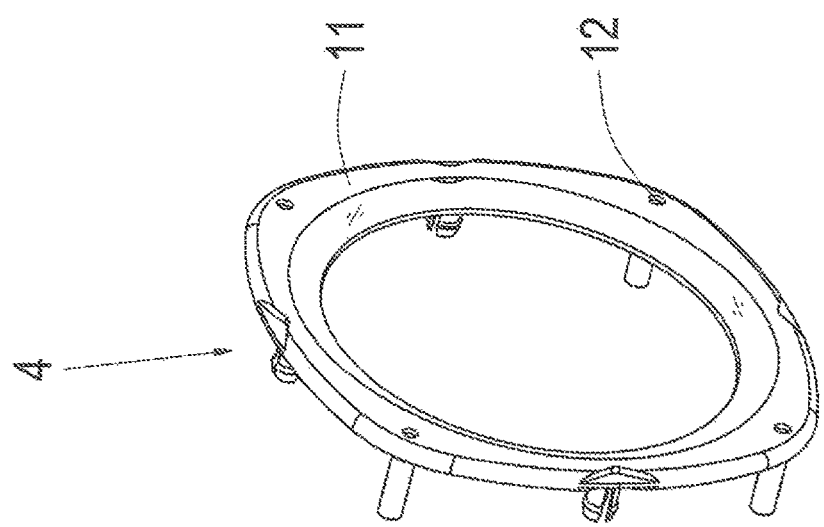
FIG. 4 shows a perspective illustration of the example fluid collecting device from the front.

FIG. 4 shows a perspective illustration of the fluid collecting device 4 from the front. The front side 11 has a multiplicity of second outlet openings 12 which, as viewed in the circumferential direction, are arranged spaced apart from one another. Both the rear side 5 and the front side 11 are of annular configuration, the rear side 5 having an internal diameter which is smaller than an internal diameter of the front side 11.

Figure 5:
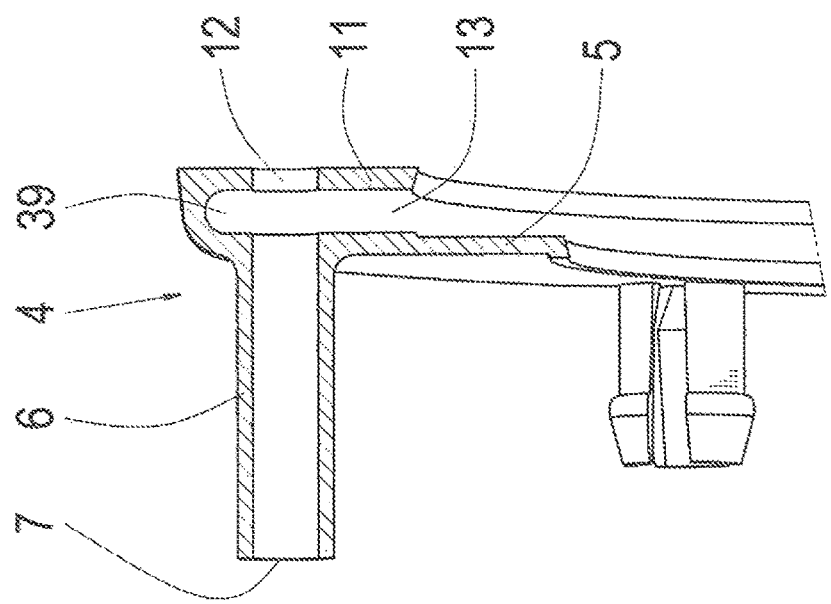
FIG. 5 shows a sectional illustration of the example fluid collecting device.

FIG. 5 shows a sectional illustration of the fluid collecting device 4. As can be seen from FIG. 5, the flow duct 13 which is provided between the front side 11 and the rear side 5 opens in the radial direction into the chamber 39. The chamber 39 lies in the radial direction above the first outlet opening 7 and the second outlet opening 12. The first outlet opening 7 is arranged at that end of the projection 6 which is remote from the rear side 5.

Figure 6:
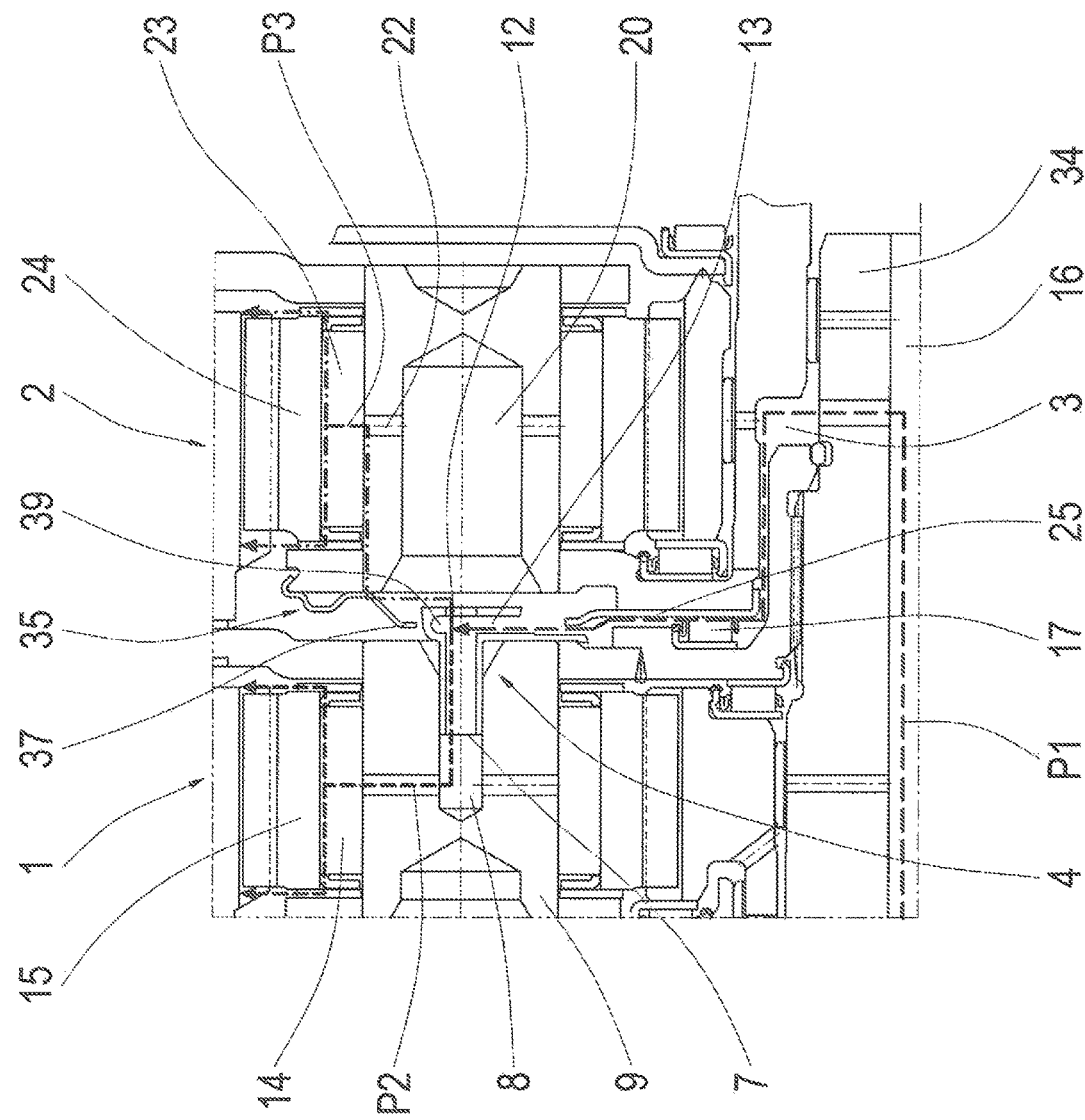
FIG. 6 shows a sectional view of the planetary transmission in accordance with the first example embodiment, a fluid path of the fluid which flows in the planetary transmission being shown.

FIG. 6 shows a sectional view of the planetary transmission in accordance with the first example embodiment, a fluid path of the fluid which flows into the planetary transmission being shown. On account of centrifugal forces, the fluid which flows in the bore 16 of the central shaft 34 is hurled into the second section of the fluid line 3, which second section is close to the central shaft 34. The fluid flows from there through the axial bearing 17 and is deflected by the disk 25 in the direction of the fluid collecting device 4.

The deflected fluid flow flows into the flow duct 13 of the fluid collecting device 4. The flow pattern of the fluid which flows into the chamber 39 is shown using dashed lines in FIG. 6 and is provided with the designation P1.

After the chamber 39 is filled with fluid, a division of the fluid which has flowed into the fluid collecting device 4 takes place into a fluid part which is directed toward the planetary gear set 1 and another fluid part which is directed toward the other planetary gear set 2. The fluid part flows via the first outlet opening 7 into the longitudinal duct 8 of the planetary gear pin 9 and from there via radial bores to the planetary bearing 14 and the planetary gear toothing system of the planet 15. The flow pattern of the fluid part is shown using dashed lines in FIG. 6 and is provided with the designation P2.

The other fluid part exits via the second outlet opening 12 from the fluid device 4 and is hurled radially to the outside on account of centrifugal forces. Here, the other fluid part comes into contact with the other fluid device 35. In particular, the other fluid part comes into contact with the angled-away other end 37 of the other fluid collecting device 35. The other fluid collecting device 35 deflects the other fluid part into the other longitudinal duct 20. The other fluid part passes from the other longitudinal duct 20 via other radial bores 22 into the other planetary bearing 23 and the other planetary gear toothing system of the other planet 24. The flow pattern of the other fluid part is shown using dashed lines in FIG. 6 and is provided with the designation P3.

FIG. 7 shows a sectional view of the planetary transmission in accordance with the second example embodiment, a fluid path of the fluid which flows in the planetary transmission being shown. The fluid path for the fluid which has flowed from the central shaft 34 into the fluid line 3 as far as the division in the fluid collecting device 4 is virtually identical to the fluid path which is shown in FIG. 6, with the exception that the deflection of the fluid flow takes place by the shoulder 31 and not by a disk 26.

The flow pattern P2 of the fluid part which is fed to the planetary gear set 1 runs in an identical manner to that in FIG. 6. The flow pattern P3 of the other fluid part differs from the flow pattern which is shown in FIG. 6 as follows.

The other fluid part which exits from the second outlet opening 11 flows into the other fluid collecting device 35 and is collected in the other chamber 30. After the other chamber 30 is filled, the other fluid part which has flowed in is guided in the direction of the other planetary gear set 2 and exits via the other outlet opening 38 from the other fluid collecting device 35. The fluid part which has flowed into the other longitudinal duct 20 of the other planetary gear pin 21 flows from there in an analogous manner to the example embodiment which is shown in FIG. 6 to the other planetary bearing 23 and/or the planetary gear toothing system of the other planet 24.

Modifications and variations can be made to the embodiments illustrated or described herein without departing from the scope and spirit of the invention as set forth in the appended claims.

LIST OF DESIGNATIONS

1 Planetary gear set
2 Other planetary gear set
3 Fluid line
4 Fluid collecting device
5 Rear side
6 Projection
7 First outlet opening
8 Longitudinal duct
9 Planetary gear pin
10 Radial bores
11 Front side
12 Second outlet opening
13 Flow duct
14 Planetary bearing
15 Planet
16 Bore
17 Axial bearing
18 Other planetary carrier
19 Ejection edge
20 Other longitudinal duct
21 Other planetary gear pin
22 Other radial bore
23 Other planetary bearing
24 Other planets
25 Angled-away disk
26 Deflection means ejection edge
27 Other rear side
28 Other front side
29 Other projection
30 Other chamber
31 Shoulder
33 Mounting clip
34 Central shaft
35 Other fluid collecting device
36 End of the other fluid collecting device
37 Other end of the other fluid collecting device
38 Other outlet opening
39 Chamber
40 Planetary carrier
E Plane
P1 Flow pattern of the fluid as far as the chamber of the fluid collecting device
P2 Flow pattern of the fluid part
P3 Flow pattern of the other fluid part
Z Feed plane

The invention claimed is:

1. A planetary transmission, comprising:
a planetary gear set (1);
another planetary gear set (2);
a fluid line (3) through which fluid is flowable to the planetary gear set (1) and to the other planetary gear set (2); and
a fluid collecting device (4) which is in fluid communication with the fluid line (3), the fluid collecting device (4) connected in a rotationally fixed manner to the planetary gear set (1), wherein the fluid collecting device (4) is configured for dividing the fluid from the fluid line (3) which has flowed into the fluid collecting device (4) into a fluid part which is flowable to the planetary gear set (1) and another fluid part which is flowable to the other planetary gear set (2) and wherein the fluid collecting device (4) has a chamber for receiving the fluid from the fluid line (3), the chamber configured and arranged such that the fluid collecting device (4) divides the fluid from the fluid line (3) into the fluid part and the another fluid part only when the chamber is overflowing with the fluid from the fluid line (3).

2. The planetary transmission of claim 1, wherein the fluid collecting device (4) is configured for exclusively dividing the fluid from the fluid line (3) into the fluid part which is flowable to the planetary gear set (1) and the another fluid part which is flowable to the other planetary gear set (2).

3. The planetary transmission of claim 1, wherein the fluid collecting device (4) is connected in a rotationally fixed manner to a planetary gear pin (9) of the planetary gear set (1).

4. The planetary transmission of claim 1, wherein the fluid collecting device (4) has at least one first outlet opening (7) and at least one second outlet opening (12), the fluid part exits from the fluid collecting device (4) through the at least one first outlet opening (7), the another fluid part exits from the fluid collecting device (4) through the at least one second outlet opening (12).

5. The planetary transmission as claimed in claim 4, wherein:

the fluid collecting device (4) has a rear side (5), at least one projection (6) extending from the fluid collecting device (4) at the rear side (5) of the fluid collecting device (4), the projection (6) having the first outlet opening (7);

the fluid collecting device (4) has a front side (11), the front side (11) of the fluid collecting device (4) having the second outlet opening (12); or the fluid collecting device (4) has the rear side (5) and the front side (11), the at least one projection (6) extending from the fluid collecting device (4) at the rear side (5) of the fluid collecting device (4), the projection (6) having the first outlet opening (7), the front side (11) of the fluid collecting device (4) having the second outlet opening (12).

6. The planetary transmission as claimed in claim 5, wherein:

a flow duct (13) is positioned between the front side (11) and the rear side (5) of the fluid collecting device (40);

the chamber is arranged in a radial direction above one or more of the first outlet opening (7) and the second outlet opening (12); or the flow duct (13) is positioned between the front side (11) and the rear side (5) of the fluid collecting device (40), the chamber arranged in a radial direction above one or more of the first outlet opening (7) and the second outlet opening (12).

7. The planetary transmission of claim 1, further comprising another fluid collecting device (35), the another fluid collecting device (35) connected in a rotationally fixed manner to the other planetary gear set (2).

8. The planetary transmission of claim 7, wherein:

the another fluid collecting device (35) is arranged in a radial direction above the fluid collecting device (4);

the another fluid collecting device (35) is configured and arranged such that the another fluid collecting device (35) guides the other fluid part towards the other planetary gear set (2); or the another fluid collecting device (35) is arranged in a radial direction above the fluid collecting device (4), the another fluid collecting device (35) configured and arranged such that the another fluid collecting device (35) guides the other fluid part towards the other planetary gear set (2).

9. The planetary transmission of claim 7, wherein the fluid collecting device (4) extends in an axial direction from the planetary gear set (1), the another fluid collecting device (35) extending in the axial direction from the other planetary gear set (2), the fluid collecting device (4) and the another fluid collecting device (35) extending oppositely along the axial direction.

10. The planetary transmission of claim 7, wherein:

the another fluid collecting device (35) has another chamber (30) for receiving the other fluid part;

the another fluid collecting device (35) has at least one other outlet opening (38), the other fluid part exiting the another fluid collecting device (35) through the at least one other outlet opening (35); or the another fluid collecting device (35) has the another chamber (39) for receiving the other fluid part, the another fluid collecting device (35) having the at least one other outlet opening (35), the other fluid part exiting the another fluid collecting device (35) through the at least one other outlet opening (35).

11. The planetary transmission of claim 7, wherein the another fluid collecting device (35) is positioned along an axial direction such that an ejection edge (19) of the fluid collecting device (4) and the another fluid collecting device (35) are disposed in one plane (E) that is perpendicular to the axial direction.

12. The planetary transmission of claim 1, further comprising a deflector, the deflector configured for deflecting the fluid in the fluid line (3) towards the fluid collecting device (4), the deflector positioned in the fluid line (3).

13. The planetary transmission of claim 12, wherein the deflector is positioned along an axial direction such that a deflector ejection edge (26) of the deflector and the flow duct (13) of the fluid collecting device (4) are disposed in a feed plane (Z) that is perpendicular to the axial direction.

14. A motor vehicle having the planetary transmission of claim 1.

* * * * *